United States Patent [19]

Cook et al.

[11] Patent Number: 4,594,299

[45] Date of Patent: Jun. 10, 1986

[54] ELECTRODE ARTICLE

[75] Inventors: John A. Cook, Faringdon; George B. Park; Robert H. McLoughlin, both of Swindon, all of England

[73] Assignee: Raychem Corporation, Menlo Park, Calif.

[21] Appl. No.: 667,035

[22] Filed: Nov. 1, 1984

Related U.S. Application Data

[63] Continuation-in-part of Ser. No. 618,110, Jun. 7, 1984, abandoned.

[30] Foreign Application Priority Data

Nov. 2, 1983 [GB] United Kingdom ............... 8329212

[51] Int. Cl.4 .................... H01M 4/08; H01M 2/14
[52] U.S. Cl. ................................. 429/129; 429/246; 29/623.3
[58] Field of Search ............... 29/623.3, 623.1, 623.2, 29/623.4, 623.5; 429/94, 246, 129

[56] References Cited

U.S. PATENT DOCUMENTS

| 3,304,203 | 2/1967 | Nordvik | 429/94 |
| 3,494,800 | 2/1970 | Shoeld | 29/623.1 |
| 3,721,113 | 3/1973 | Hovsepian |  |
| 4,476,624 | 12/1984 | Klein et al. | 29/623.3 |
| 4,502,903 | 3/1985 | Bruder |  |

FOREIGN PATENT DOCUMENTS

| 2442513 | 12/1980 | France . |  |
| 7305805 | 12/1968 | Japan | 29/623.3 |
| 1120267 | 7/1968 | United Kingdom . |  |

Primary Examiner—Donald L. Walton
Attorney, Agent, or Firm—Edith A. Rice; Herbert G. Burkard

[57] ABSTRACT

Electrode material, preferably lithium metal, is protected by a layer of material ready to function as an electrode separator and capable of sufficient ionic conductivity to provide an electrolyte, preferably a solvent-free polymeric electrolyte. The electrode material may be rolled to reduce its thickness while so protected.

28 Claims, 1 Drawing Figure

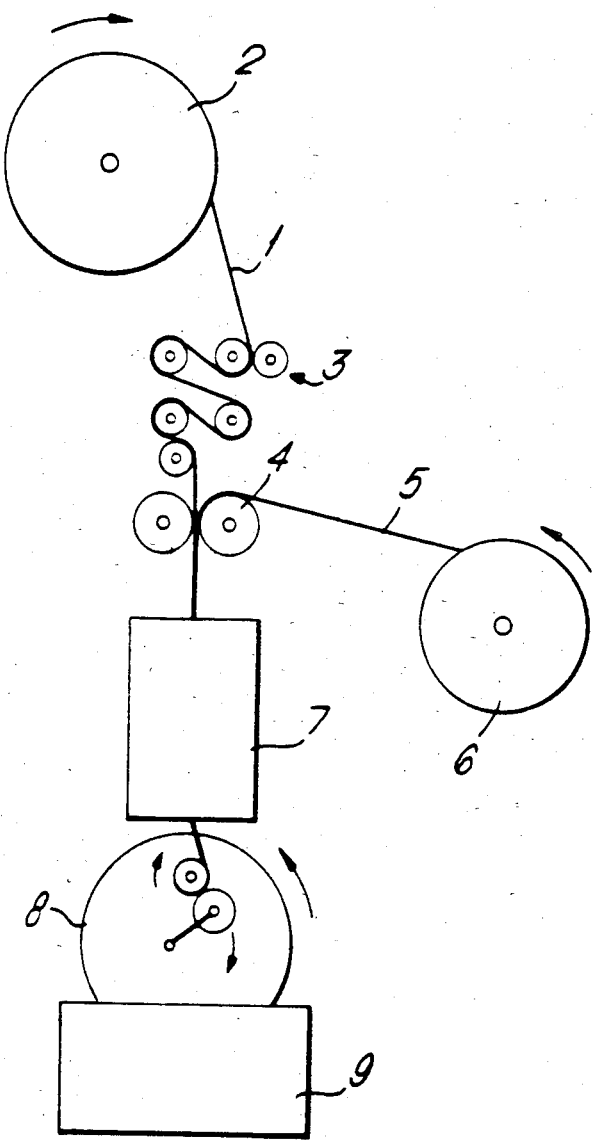

ELECTRODE ARTICLE

This application is a continuation-in-part of application Ser. No. 618,110, filed June 7, 1984, now abandoned, the disclosure of which is incorporated herein by reference.

This invention relates to protected electrode materials and the use thereof in electrical devices.

Some electrical components, for example some electrode materials, are sensitive insofar as they are difficult to handle during manufacture of electrical devices owing to physical weakness or high chemical reactivity, which may necessitate inconvenient handling procedures and/or special conditions such as dry room assembly. Examples of such sensitive materials include alkali metals and alkaline earth metals, notably lithium metal electrodes for lithium cells. In one kind of such cells, the electrodes are assembled with sheets of polymer compositions which are inherently ionically conductive, often in liquid-free form commonly known as "polymeric electrolytes".

Lithium metal is difficult to roll into thin strips for use as in electrode, and U.S. Pat. No. 3,721,113 describes a method of alleviating this difficulty by rolling the lithium between smooth (surface asperities less than one micron) polymeric surfaces having sufficiently low critical surface tension to prevent adhesion to the lithium. The polymer may be a coating on the surface of rolls used to roll the lithium, or may be in the form of sheeting enclosing or facing the lithium, which does not adhere to the lithium and is peeled off the lithium strip after rolling. While this method facilitates the rolling operation, which produces the thin lithium strip, it does not improve the efficiency of assembling the delicate lithium strip into electrical devices.

Numerous variations of the materials and structure of individual cell electrodes have previously been described, with the emphasis on the chemical and electrical performance of the materials and with little attention to the assembly process itself. For example, British Pat. No. 1533279 describes the use of an adherent thin coating of a vinyl polymer film on the surface of lithium strip electrodes for lithium/thionyl chloride cells to prevent electrode passivation, which tends to occur on storage of that particular kind of cell. The vinyl polymer film is insoluble in the thionyl chloride and must not be degraded or decomposed in the presence of the same. It must be sufficiently thin to permit ion transfer between the lithium and the thionyl chloride as required for current flow in operation of the cell. It is stated, though not demonstrated in the examples of the patent, that the vinyl polymer film may also serve as the sole electrode separator of the cell or may permit the use of a thinner separator than would normally be required. Somewhat thicker films of the vinyl polymer are recommended for that purpose, but it is made clear that the ion transfer needed for acceptable electrical performance of the cell will be adversely affected by thus increasing the film thickness. Electrode separators of polystyrene are described in U.S. Pat. No. 4,315,602 for alkaline cells, the separators again being necessarily thin enough to permit ion transfer.

French Pat. No. 7832978 (Publication No. 2442513) describes preparation of polymeric electrolyte films and their application to reactive metal electrodes by techniques such as solvent casting or pressure lamination of the polymeric film onto the metal or flowing the molten metal onto the polymer film and cooling.

The present invention relates to articles whereby significant improvements in electrical device assembly processes can be achieved, as hereinafter described.

One aspect of the invention provides an article comprising sensitive electrode material protected by a flexible layer of protective material wherein the layer is ready to function as an electrode separator when the article is used to provide an electrode in an electrical device, and is inherently capable of sufficient ionic conductivity to provide an electrolyte when the article is used as foresaid, and the article is in a form suitable for feeding to automatic equipment capable of assembling the said device. The ionically conductive electrode separator layers of the present invention can be thick enough to survive deformation of the electrode material while continuing to protect the electrode material from damage and contamination.

This has the advantage that the flexible protective layer permits the development of assembly processes which conveniently include the step of deforming the sensitive electrode materials to increase their surface area while protected by the protective material, for example to reduce the thickness of the electrode material, and/or the step of arranging it in a desired form such as a coiled electrode, as will be further described hereinafter. The invention includes such deformed articles whether or not in a feedable form. For this purpose, the electrode material may advantageously be a metal which is malleable under temperatures and pressures which do not unacceptably damage the protective layer.

The realisation that the protection material, whether adherent to or merely associated with the electrode material in this form of article, can be used to help the sensitive electrode material to withstand the stresses of automated assembly thus leads to important processing advantages. Adherent protective layers are preferred, for which purpose the layer may have suitable adhesion-promoting surface properties, such as surface asperities greater than one micron. The feedable article is preferably in the form of an elongate strip, preferably of sufficient length to make a plurality of the said electrical devices.

The layer of protective material is preferably "able to survive" mechanical deformation of the electrode material in the sense that it will retain its integrity and maintain a useful degree of protection both against mechanical damage and against contamination of the electrode material after a significant amount of deformation, for example for the aforementioned purposes. The precise amount of deformation which the protective material will preferably is a matter of commonsense for practical readers. Brittle layers which would crack so as to reduce the protection unacceptably are thus excluded as are materials which would react unacceptably in other ways to such treatment, for example very thin layers which would become unacceptably scuffed or torn.

The statement that the protective material is "ready to function" as an electrode separator will be understood to mean that the protective layer will so function without further processing or alteration when the article is used as aforesaid. This is because the protective material is capable of sufficient ionic conductivity to provide both the electrode separator and an electrolyte when the article is used as aforesaid. Such provision of an electrolyte is preferably independent of the action of liquid, preferred "dry" protective materials of this kind being so-called polymeric electrolytes, for example.

The protective layer may be applied to the electrode material by any convenient technique such as solvent coating or pressure lamination, and this can be carried out as a continuous process.

It is an advantage of the present invention that the protective materials will provide protection against contamination of the electrode material. This is especially advantageous in connection with electrode materials which may react violently with certain contaminants, for example alkali metals with water, since the protective material will reduce the likelihood of violent reaction.

The protective material may thus act as an electrode separator, pre-assembled with the electrode material, thus eliminating some of the problems of handling and aligning electrodes and separators during the assembly of the electrical devices, and facilitating automated processing.

It will be understood that the sensitive electrode material may require protection for various reasons, for example materials which are subject to attack by atmospheric gases or moisture during storage; materials which may react prematurely with liquid with which they may come into contact during assembly materials which are subject to poisoning by contaminants during storage; and materials which lack physical strength or integrity (e.g. materials having less tensile strength than an equal thickness of the protective material) and thus require protection from physical damage. The invention is especially useful for materials which require physical protection owing to physical weakness while permitting access of fluids to the material in use. By suitable selection of its ingredients, the protective material can also be made to perform other secondary functions, for example providing chemical reactants or catalysts in a porous layer on the surface of the sensitive material.

If desired, the protective material may have an overlying removable layer of relatively fluid-impermeable material to provide extra protection, the removable material being the same as, or different from the underlying protective material and preferably being a substantially non-porous film (e.g. Saran), which will be removed prior to assembly of the article in an electrical device.

It is a further advantage of the present invention that the electrode article may be provided in a form, for feeding to equipment capable of assembling successive portions of the article into a succession of the electrical devices as aforesaid, preferably automatically and continuously. The advantages of such an automated process over the piece-by-piece hand assembly methods hitherto used in the absence of the articles according to this invention, especially for alkali metal or alkaline earth metal electrode materials, will be appreciated.

The articles according to this invention can be assembled with the opposing electrode material and other components of the electrical device with fewer difficulties than are encountered in handling and aligning unprotected electrode materials, especially reactive metals such as alkali metals or alkaline earth metals. The anode or the cathode, or both, of suitable electrical devices, for example electrical cells, may be provided by way of articles according to this invention, reactive metal anodes, especially lithium anodes, for non-aqueous electrical cells being an important practical application of the articles. The articles may include other components, for example current collector layers, as known per se, on part of the electrode material, e.g. on one major surface of a flat strip electrode. Other arrangements may be contemplated to suit other additional components incorporated in the articles of this invention.

This invention is especially useful in relation to continuous metal, preferably reactive metal, electrodes such as alkali metal or alkaline earth metal electrodes, especially lithium electrodes for lithium cells. Production of thin sheet electrodes of these and other materials can be facilitated by deforming the electrode material, for example by rolling, while in contact with the layer of protective material so as to increase its surface area, e.g. to decrease the thickness of the electrode material or otherwise alter its form or surface configuration. In this way, thin sheets of lithium, of less than 0.25 millimeters, preferably less than 0.125 millimeters, for example of about 0.075 millimeters, thickness, which would otherwise be difficult and expensive to make and handle, can be produced from more readily available 0.25 millimeter strip. This aspect of the invention thus provides an article comprising sensitive electrode material protected by a layer of protective material, the electrode material having been deformed while in contact with the protective material and the protective material being ready to function as an electrode separator when the article is used to provide an electrode in an electrical device, and being capable of sufficient ionic conductivity to provide an electrolyte when the article is used as aforesaid.

The protective material may be deformed, e.g. stretched, so as to enhance its function in the device, e.g. its ability to provide an electrode separator and/or electrolyte. This may be useful for protective materials which require permeation by liquid in order to provide adequate ionic conductivity.

The invention includes electrodes for electrical devices formed of the polymer-protected electrode articles, and electrical devices including such electrodes.

The invention also includes methods of making the protected electrode articles and methods (especially automated methods) of making an electrical device incorporating the protected electrode articles. The latter method may include the steps of making the protected electrode article as described above, and of bringing the article into contact with an electrolyte liquid and allowing the liquid to permeate the layer of polymeric material in order to make contact with the electrode material.

Suitable electrically conductive protective materials include inorganic salts dispersed in organic polymer material, preferably capable of permitting sufficient transfer of dissociated ions of the salt to provide the required ionic conductivity in the substantial absence of any liquid.

For example salt-loaded polymers having the repeating unit

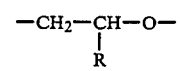

wherein R is hydrogen or a group Ra, $-CH_2OR_a$, $-CH_2OR_eR_a$, $-CH_2N(CH_3)_2$, in which $R_a$ is $C_1-C_{16}$, preferably $C_{1-4}$ alkyl or cycloalkyl, and $R_e$ is an ether group of formula $-CH_2CH_2O-p$ wherein p is a number from 1 to 100, preferably 1 or 2; or having the repeating unit

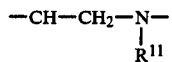

wherein $R^{11}$ is $R_a$, or ReRa, as defined above; or having the repeating unit

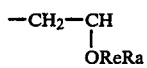

wherein Re and Ra are as defined above. The preferred salts are the strong acid salts of alkali metals or ammonium. Copolymers of the above poolymers may also be useful.

The protective material preferably will not interact with the electrode material, although beneficial interactions are not excluded from the invention.

The accompanying drawing illustrates schematically electrical cell production equipment capable of performing a method of making an electrical device according to this invention.

Referring to the drawing, a strip (1) of lithium anode material protected by polymeric electrolyte protective material according to the invention is fed from a supply roll (2) via feed rolls (3) to lay-up rolls (4) where a strip (5) of cathode material from feed roll (6) is closely aligned with the protected anode, the protective electrolyte material carried by the lithium anode being between the anode and the cathode. The aligned anode/cathode assembly then proceeds to a spool threading unit (7) and thence to a spool winding unit (8) wherein the assembly is coiled or spooled to provide a coiled electrode assembly. The coiled assembly then passes to the spool casing unit (9), where the coiled assembly is sealed in a cell casing. Suitable practical embodiments of the production equipment thus schematically described can readily be devised, for example as follows.

EXAMPLE 10 g polyethylene oxide (Union Carbide WSR 205) was dissolved in acetonitrile (pre-distilled) with stirring to give a 3% solution. The appropriate amount of the salt $LiCF_3SO_3$ (vacuum dried at 130° C. for 4 hours) to give a polymer oxygen lithium ion ratio (O:Li) of 10:1 was then added to the solution. The solution was then stirred at room temperature for 4 hours.

Polymer film of thickness 0.3 mm was then solvent cast from the solution by placing the solution in a flat glass petrie dish and allowing the solvent to evaporate slowly. The films were then vacuum dried at 105° C. for 8 hours, before being placed in a vacuum desiccator and transferred to a dry box.

A length of lithium foil supplied by Foote Mineral Company, 35 mm wide, 0.25 mm thick was laminated on either side with the polymer film. The laminate was reduced in thickness by drawing the composition between nip rollers. The lithium thickness was reduced to 0.10 mm and the polymer film was reduced to 0.12 mm.

We claim:

1. An article comprising sensitive electrode material protected by a layer of protective material, the electrode material having been deformed so as to decrease its thickness, thereby substantially increasing its surface area, while in contact with the protective material and the protective material being ready to function as an electrode separator when the article is used to provide an electrode in an electrical device, and being capable of sufficient ionic conductivity to provide an electrolyte when the article is used as aforesaid.

2. An article according to claim 1, wherein the protective material is fluid-permeable.

3. An article according to claim 1, wherein the protective material is adhered to the surface of the electrode material.

4. An article according to claim 1, wherein the protective material is associated with, but not adhered to, the electrode material.

5. An article according to claim 1, wherein the protective material is capable of sufficient ionic conductivity to provide electrolyte independent of the action of liquid.

6. An article according to claim 1, wherein the protective material comprises an inorganic salt dispersed in organic polymer material capable of permitting sufficient transfer of dissociated ions of the salt to provide the required ionic conductivity in the substantial absence of any liquid.

7. An article according to claim 6 wherein the organic polymer comprises poly(ethylene oxide).

8. An article according to claim 1, incorporating at least one additional material capable of functioning as another component of the said electrical device in addition to the electrode material and the protective material.

9. An article according to claim 1, incorporating at least one additional material capable of functioning as a current collector when the article is used to provide an electrode in an electrical device.

10. An article according to claim 1, wherein the electrode material is continuous metal.

11. An article according to claim 1, wherein the electrode material is an alkali metal or an alkaline earth metal.

12. An article according to claim 1, wherein the electrode material is lithium metal.

13. An article according to claim 1, wherein the electrode material is less than 0.25 millimeters thick.

14. An article according to claim 1, wherein the protective material has been deformed while in contact with the electrode material so as to enhance its function in the electrical device.

15. An article according to claim 1, wherein the protective material is overlaid by a removable further layer of material.

16. An electrode for an electrical device formed from an article according to claim 1.

17. An electrical device incorporating an electrode formed from an article according to claim 1.

18. An electrical device incorporating an electrode formed from an article according to claim 1 and incorporating a liquid which permeates the layer of protective material.

19. An article according to claim 1 wherein the electrode material is less than 0.125 mm thick.

20. A method of preparing an electrode comprising a sensitive electrode material, comprising the steps of:
   (a) providing said sensitive electrode material;
   (b) protecting said electrode material by contacting it with a protective material ready to function as an electrode separator and capable of sufficient ionic conductivity to function as an electrolyte; and (c) deforming said electrode material protected by said protective so as to decrease its thickness, thereby substantially increasing the surface area of said electrode material.

21. A method according to claim 20 wherein in said protecting step said electrode material is adhered to said protective material.

22. A method according to claim 20 wherein in said deforming step the thickness of said electrode material is reduced to below 0.125 mm.

23. A method of preparing an electrical device, comprising the steps of:

(a) providing an electrode comprising a sensitive electrode material protected by a protective material ready to function as an electrode separator and capable of sufficient ionic conductivity to function as an electrolyte and said electrode material having been deformed while in contact with said protective material so as to decrease its thickness, thereby substantially increasing the surface area of said electrode material, and (b) incorporating said electrode material protected by said protective material into said electrical device.

24. A method according to claim 23 wherein said electrical device is an electrical cell.

25. A method according to claim 23 wherein the thickness of said electrode material is less than 0.125 mm.

26. A method according to claim 20 or 23 wherein said electrode material is lithium metal.

27. A method according to claim 20 or 23 wherein said protective material comprises an organic polymer having dispersed therein an inorganic salt.

28. A method according to claim 20 or 23 wherein said organic polymer comprises poly(ethylene oxide).

* * * * *

UNITED STATES PATENT AND TRADEMARK OFFICE
CERTIFICATE OF CORRECTION

PATENT NO.  : 4,594,299

DATED       : June 10, 1986

INVENTOR(S) : John Cook, George Park, Robert McLoughlin

It is certified that error appears in the above-identified patent and that said Letters Patent is hereby corrected as shown below:

Col. 1, line 24, after as, delete "in" and insert in lieu thereof -- an --.

Col. 2, line 13, after as, delete "foresaid" and insert in lieu thereof -- aforesaid --.

Col. 2, line 53, after deformation, insert -- to --.

Col. 2, line 54, after will, insert -- be subjected --.

Signed and Sealed this

Sixteenth Day of December, 1986

Attest:

DONALD J. QUIGG

*Attesting Officer*         *Commissioner of Patents and Trademarks*